(12) United States Patent
Keller, Jr. et al.

(10) Patent No.: US 8,025,548 B2
(45) Date of Patent: *Sep. 27, 2011

(54) EXTERNAL DIAPHRAGM GAME CALL WITH MANUAL DIAPHRAGM MANIPULATION

(75) Inventors: William L. Keller, Jr., Delta, CO (US); Ron M. Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 370 days.

This patent is subject to a terminal disclaimer.

(21) Appl. No.: 11/683,504

(22) Filed: Mar. 8, 2007

(65) Prior Publication Data

US 2007/0149088 A1   Jun. 28, 2007

Related U.S. Application Data

(63) Continuation of application No. 10/907,336, filed on Mar. 29, 2005.

(51) Int. Cl.
*A63H 33/40* (2006.01)
*A63H 5/00* (2006.01)
(52) U.S. Cl. .................. 446/202; 446/208; 446/397
(58) Field of Classification Search .......... 446/176, 446/180, 202, 205–208, 397, 416
See application file for complete search history.

(56) References Cited

U.S. PATENT DOCUMENTS

| 291,548 | A | 1/1884 | Swan |
| 446,209 | A | 11/1905 | Howe |
| 805,727 | A | 11/1905 | Howe |
| 1,052,525 | A | 2/1913 | Smith |
| 1,120,980 | A | 12/1914 | Schofield |
| 1,133,868 | A | 3/1915 | Lynn |
| 1,418,755 | A | 6/1922 | Voelchert |
| 1,506,364 | A | 8/1924 | Chiron et al. |
| 1,680,159 | A | 8/1928 | McVicker |
| 2,093,453 | A | 9/1937 | Kellotat |
| 2,198,993 | A | 4/1940 | Felgner |
| D141,804 | S | 7/1945 | Wittke |
| 2,583,400 | A | 1/1952 | Wade |
| 2,833,086 | A | 5/1958 | Johenning |
| 2,969,611 | A | 1/1961 | Warren |
| 3,020,675 | A * | 2/1962 | Boecker .................. 446/208 |
| 3,172,223 | A | 3/1965 | Stager |
| 3,579,903 | A * | 5/1971 | Stewart .................. 446/208 |
| 3,583,094 | A | 6/1971 | Tribell |
| 3,722,133 | A | 3/1973 | Morgan |
| 3,811,221 | A | 5/1974 | Wilt |
| 3,815,283 | A | 6/1974 | Piper |
| 3,968,592 | A | 7/1976 | Piper |
| 3,971,098 | A | 7/1976 | Davis |
| 4,054,134 | A | 10/1977 | Kritzer |
| 4,138,800 | A | 2/1979 | Lege |
| 4,218,845 | A | 8/1980 | Evans et al. |
| 4,229,902 | A | 10/1980 | Smith |
| 4,335,539 | A | 6/1982 | Jones |
| 4,341,037 | A | 7/1982 | Moss |

(Continued)

*Primary Examiner* — Gene Kim
*Assistant Examiner* — Alyssa M Hylinski
(74) *Attorney, Agent, or Firm* — McKee, Voorhees & Sease, P.L.C.

(57) ABSTRACT

A game call having a mouthpiece with an internal latex diaphragm and secured to said mouthpiece is a diaphragm plunger which is operable by pressing an artificial tongue-like pliable section into contacting with the diaphragm, thereby changing the pitch of the sound produced.

27 Claims, 5 Drawing Sheets

U.S. PATENT DOCUMENTS

| | | |
|---|---|---|
| 4,387,531 A | 6/1983 | Jacob |
| 4,483,097 A | 11/1984 | Piper |
| 4,551,112 A | 11/1985 | Johnson |
| 4,576,584 A | 3/1986 | Hill |
| 4,614,503 A | 9/1986 | Skoda |
| 4,618,213 A | 10/1986 | Chen |
| 4,637,154 A | 1/1987 | Laubach |
| 4,737,128 A | 4/1988 | Moormann et al. |
| 4,737,130 A | 4/1988 | Mann |
| 4,752,270 A | 6/1988 | Morton |
| 4,761,149 A | 8/1988 | Laubach |
| 4,764,145 A | 8/1988 | Kirby |
| 4,799,913 A | 1/1989 | Wolfe |
| 4,888,903 A | 12/1989 | Knight et al. |
| 4,897,067 A | 1/1990 | Piper |
| 4,915,660 A | 4/1990 | Overholt |
| 4,941,369 A | 7/1990 | Specht et al. |
| 4,950,198 A * | 8/1990 | Repko, Jr. .................. 446/207 |
| 4,950,201 A | 8/1990 | Sceery |
| 4,960,400 A | 10/1990 | Cooper |
| 4,976,648 A | 12/1990 | Meline |
| 5,061,220 A * | 10/1991 | Cooper ........................ 446/208 |
| 5,122,088 A | 6/1992 | Meline |
| 5,293,805 A | 3/1994 | Guardala et al. |
| 5,415,578 A | 5/1995 | Jacobsen |
| 5,445,551 A | 8/1995 | Ady |
| 5,520,567 A | 5/1996 | Jacobsen |
| 5,549,498 A | 8/1996 | Kirby |
| 5,577,946 A | 11/1996 | Oathout |
| 5,582,530 A | 12/1996 | Ady |
| 5,603,361 A * | 2/1997 | Cuisinier ........................ 141/26 |
| 5,613,891 A | 3/1997 | Lamo |
| 5,704,154 A | 1/1998 | Galfidi, Jr. |
| 5,735,725 A | 4/1998 | Primos |
| 5,785,574 A * | 7/1998 | Sears ........................... 446/208 |
| 5,803,785 A | 9/1998 | Primos, Jr. et al. |
| 5,885,125 A | 3/1999 | Primos |
| 5,910,039 A | 6/1999 | Primos et al. |
| 6,039,627 A | 3/2000 | Forbes |
| 6,042,447 A | 3/2000 | Thompson |
| 6,045,429 A * | 4/2000 | Marino ........................ 446/207 |
| 6,179,684 B1 | 1/2001 | Carlton |
| 6,231,418 B1 * | 5/2001 | Hancock et al. ............. 446/207 |
| 6,328,623 B1 | 12/2001 | Bean |
| 6,413,140 B1 | 7/2002 | Primos |
| 6,471,563 B1 | 10/2002 | Carlton |
| 6,572,430 B1 | 6/2003 | Primos |
| 6,575,804 B1 * | 6/2003 | Primos ........................ 446/202 |
| 6,612,894 B2 * | 9/2003 | Carlton ........................ 446/202 |
| 6,648,716 B2 | 11/2003 | Bean |
| 6,709,309 B1 * | 3/2004 | Bishop et al. ................ 446/208 |
| 6,767,270 B1 | 7/2004 | Primos |
| 7,553,210 B1 * | 6/2009 | Keller et al. ................. 446/202 |

* cited by examiner

EXTERNAL DIAPHRAGM GAME CALL WITH MANUAL DIAPHRAGM MANIPULATION

CROSS-REFERENCE TO RELATED APPLICATIONS

This application is a continuation application of U.S. application Ser. No. 10/907,336 filed Mar. 29, 2005, which application is hereby incorporated by reference in its entirety.

FIELD OF THE INVENTION

The present invention generally relates to game calling, and more particularly relates to manually operated game calls, and even more particularly relates to an apparatus and method for calling game using variable pitch sounds and without requiring tongue or lip manipulations to adjust the pitch.

BACKGROUND OF THE INVENTION

In the past, hunters have used various devices to call game, such as the ubiquitous tube call, in which air is blown through a mouthpiece and over a reed to generate sound. Other calls have used a flexible bellows, plunger or bulb attached to a tube call to eliminate the need for blowing through the mouthpiece. Other hunters have used in-the-mouth diaphragms to generate sound. Still other calls have used latex diaphragms in conjunction with calls, with most components being located external to the mouth.

While those calls have many advantages, they also have significant drawbacks. First of all, the skill required to successfully operate the in-the-mouth diaphragm call is often more than is possessed by inexperienced hunters or hunters who may use such a call only a few days or weeks each year. Many hunters are intimidated by such calls, fearing that they are difficult to blow correctly.

Secondly, the tube call and the external to-the-mouth diaphragm calls have suffered from limited ability to easily vary the sound produced by the call.

Thirdly, the calls using bellows, plungers and bulbs have often had limited operational characteristics, owing to the lessened airflow control that a bellows often has in comparison to a mouth-blown call.

Consequently, there exists a need for improvement in game calling methods and apparatuses.

BRIEF SUMMARY OF THE INVENTION

It is an object of the present invention to provide an easily operated game call having pitch variation capabilities, especially for emulating elk sounds which have non-uniform pitch variations during the duration of the call sequence.

It is a feature of the present invention to include a diaphragm plunger for controlling pitch.

It is an advantage of the present invention to allow for manipulation of the diaphragm plunger in an easy-to-use fashion.

It is another advantage of the present invention to increase the certainty that the call will produce an appropriate sound.

The present invention is an apparatus and method for calling game which is designed to satisfy the aforementioned needs, provide the previously stated objects, include the above-listed features and achieve the already articulated advantages. The present invention is carried out in a "fearless" approach in a sense that the amount of fear of making errant sounds which often are produced by multi-pitch in-the-mouth diaphragm calls, especially when used by a novice or infrequent game caller, is dramatically reduced, as well as the fear of gagging or choking on an in-the-mouth call is also reduced.

Accordingly, the present invention is an apparatus and method for calling game which includes an external mouth-blown diaphragm call having a manually operative plunger coupled to a mouthpiece for manipulating airflow and a diaphragm disposed within an air chamber within the mouthpiece, whereby variable position of the plunger provides for variation of sound produced by the diaphragm.

BRIEF DESCRIPTION OF THE DRAWINGS

The invention may be more fully understood by reading the following description of the preferred embodiments of the invention, in conjunction with the appended drawings wherein.

DETAILED DESCRIPTION OF THE PREFERRED EMBODIMENT

Figure 1:
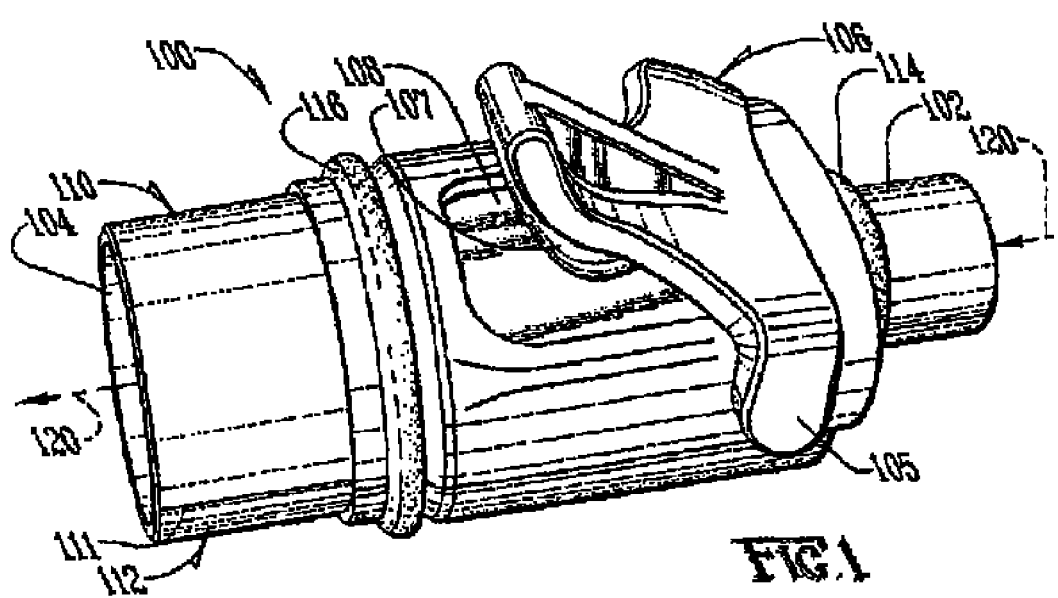
FIG. 1 is a perspective view of a call of the present invention.

Now referring to the drawings, wherein like numerals refer to like matter throughout, and more particularly to FIG. 1, there is shown an apparatus of the present invention generally designated 100, which includes a mouthpiece end 102 and sound exiting end 104. A diaphragm plunger 106 is shown disposed above an artificial tongue or pliable plunger pad top 108. Plunger 106 pivots around pivot pointy 105 and has pad engaging protuberance 107. The call 100 has a body which is broken along line 111 into a top body section 110 and bottom body section 112, which are held together by first "O" ring 114 and second "O" ring 116. The above components, except for the "O" rings and the pliable plunger pad top 108, are preferably made of durable stiff plastic, such as PVC (polyvinylchloride), ABS plastic (Acrylonitrile-Butadiene-Styrene( ) or other suitable substitute.

The "O" rings 114 and 116 are preferably circular rings of circular material (having a circular cross-section) such as rubber or similar material which is suitable for any particular design needs. Surface features, such as ridges or channels in the top and bottom body sections 110 and 112, may be included to help retain the "O" rings in predetermined positions.

In a preferred embodiment of the present invention, the plunger 106 may be detachable from the top and bottom body sections 110 and 112, so as to permit manipulation of the artificial tongue or pliable plunger pad top 108 by direct interaction with a finger or thumb.

Figure 2:
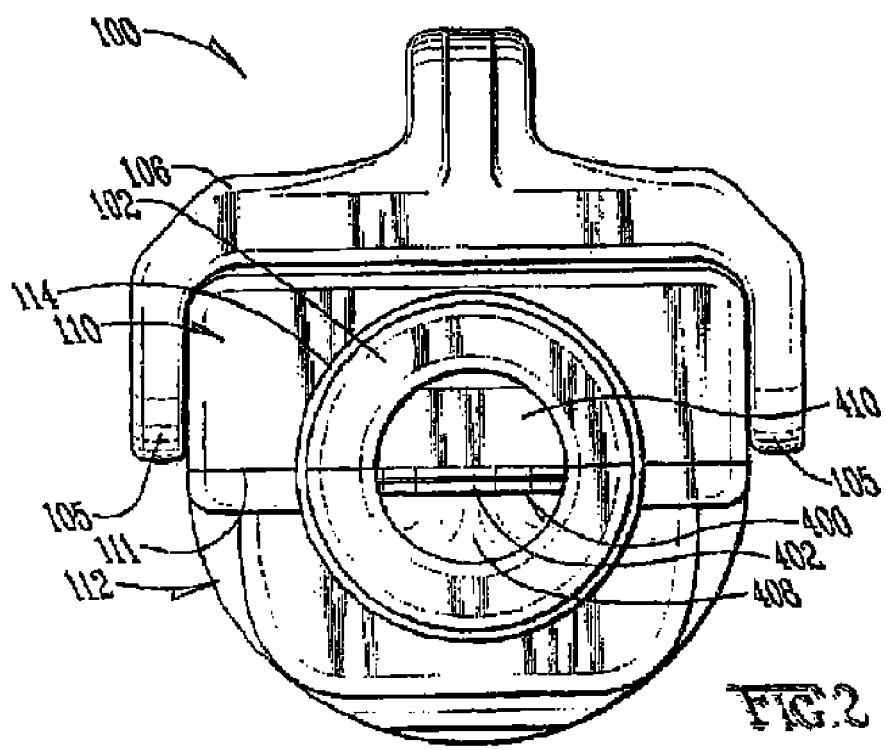
FIG. 2 is a perspective inlet end view of a call of FIG. 1.

Now referring to FIG. 2, there is shown an inlet end view of the call of FIG. 1.

Figure 3:
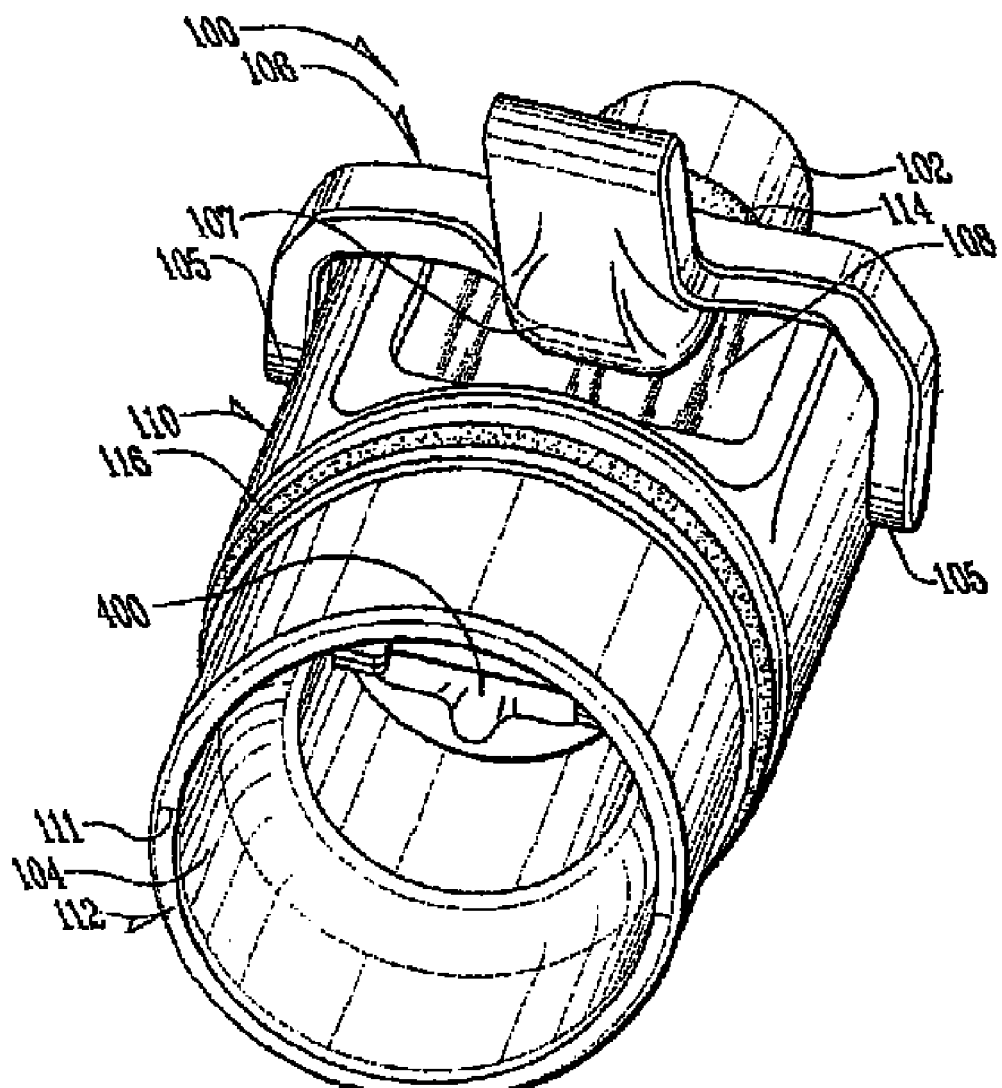
FIG. 3 is a perspective outlet end view of the call of FIG. 1.

Now referring to FIG. 3, there is shown an outlet end view of the call of FIG. 1.

Figure 4:
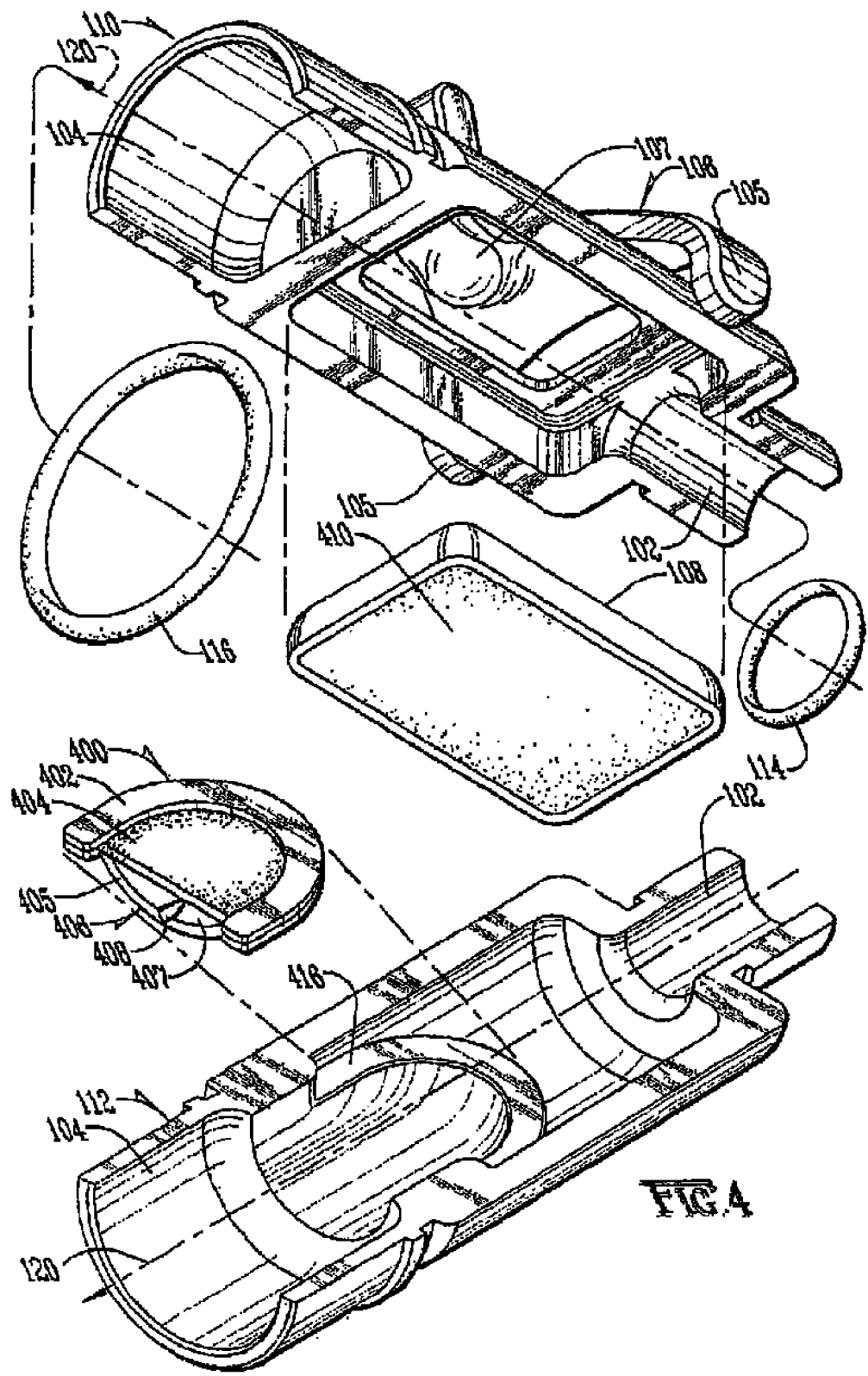
FIG. 4 is an exploded perspective view of the call of FIG. 1.

Now referring to FIG. 4, there is shown an exploded view of the call 100 of FIG. 1. Artificial tongue or plunger pad top 108 is shown inverted to expose a bottom plunger pad portion 410, which may, but need not be smooth, and forms a portion of the top body section 110. The artificial tongue or pliable plunger pad top 108 and plunger pad smooth bottom portion 410 are preferably made of a material such as ibeflex, santoprene or other substitute which is relatively much more pliable than the material of the remainder of the top and bottom body sections 110 and 112. Call 100 includes a removable tone trough diaphragm insert 400 having a "U"-shaped latex clamping member 402, a tone trough or sound chamber dome 406 and a diaphragm 404 having a free edge 405. Tone trough diaphragm insert 400 fits upon seat flange 416 inside the bottom body section 112. Tone trough diaphragm insert other than the diaphragm itself is preferably made of a material similar to the material of the top and bottom body sections 110 and 112. The diaphragm is preferably a latex or other suitable material which can be used to generate sounds as a result of vibration as air moves over the diaphragm. The use of diaphragms in such a manner is well known in the art. Similarly, the use of a tone trough dome 406 with a tone trough or non-uniformly curved underside surface 408, in combination with a diaphragm, is also well known in the art. It should be understood that while the embodiment shown has a diaphragm and dome combined as a single unit, these two could be separate components, or the dome could be an integral part of the bottom section 112.

The pliable plunger pad 108 may be constructed so as to provide a structure to simulate a human tongue so as to mimic the interaction which occurred in the past between a human tongue, a latex diaphragm and a dome, such as in prior art tone trough-type in-the-mouth game call as shown in U.S. Pat. No. 6,471,563.

Figure 5:
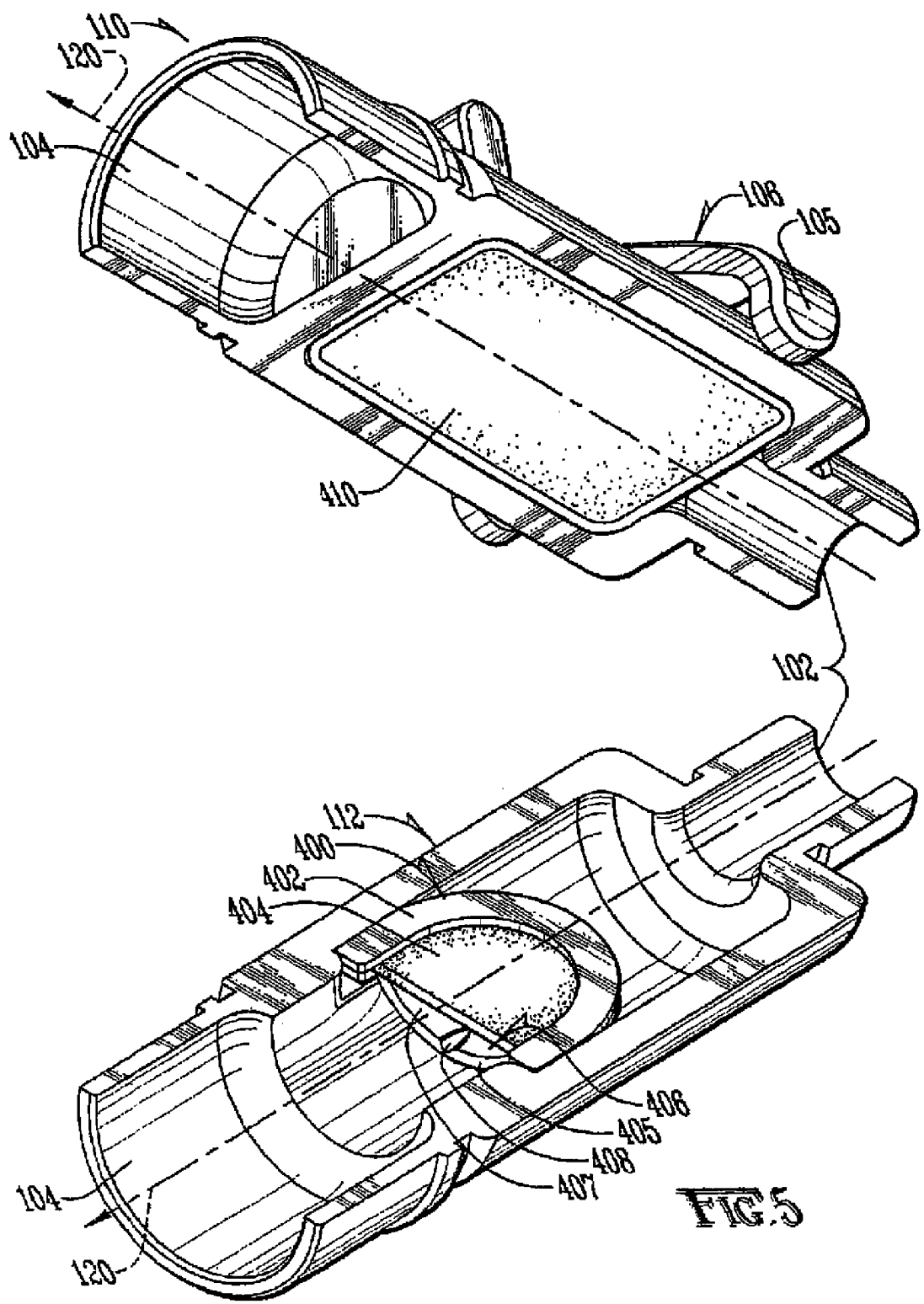
FIG. 5 is a partially exploded view of the call of FIG. 1.

Now referring to FIG. 5, there is shown a partially exploded view of the call of FIG. 1.

Figure 6:
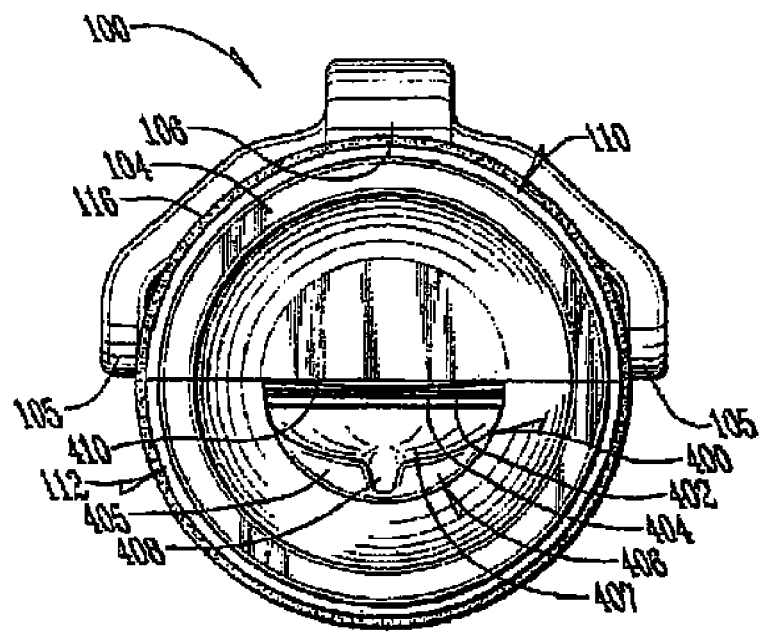
FIG. 6 is an outlet end view of the call of FIG. 1 where the plunger is not depressed and the latex is undisturbed.

Now referring to FIG. 6, there is shown an outlet end view of the call of FIG. 1 where the plunger 106 is no6 depressed and the latex 404 is undisturbed.

Figure 7:
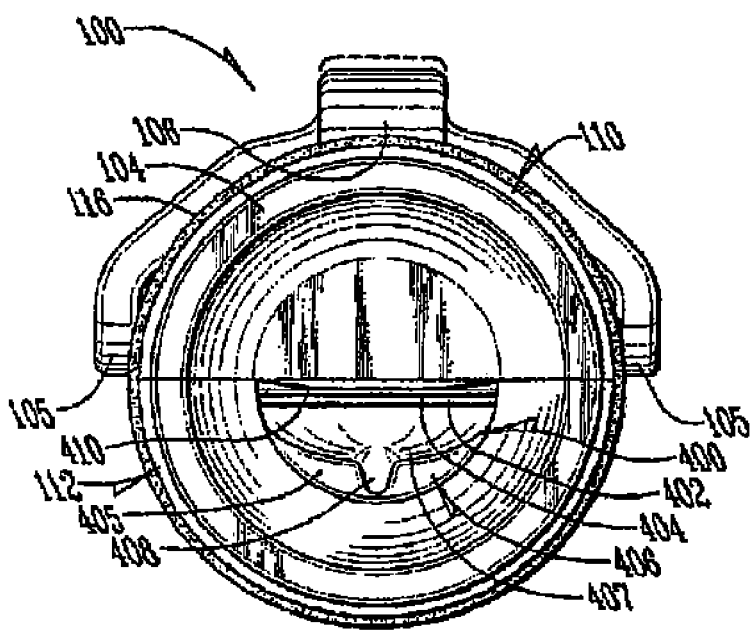
FIG. 7 is an outlet end view of the call of FIG. 1 where the plunger is depressed and the latex has been contacted by the artificial tongue.

Now referring to FIG. 7, there is shown an outlet end view of the call of FIG. 1 where the plunger 106 is depressed and the latex 404 has been contacted by smooth bottom portion of artificial tongue 410. The latex 404 is disposed between a narrow gap between non-trough portions 407 of the dome 406 and the artificial tongue 410.

In operation, the present invention accomplishes the goal of generating sounds suitable for calling game as follows:

Air is blown into the mouthpiece end 102 along airflow axis 120; the diaphragm 404 vibrates inside the call 100, thereby generating a sound; the plunger 106 is depressed, causing the smooth side of plunger pad 410 to constrict the passage available for airflow. This constriction may result in a venture effect to occur, whereby the speed of airflow increases through the constricted area. A change in airflow speed may change the sounds being generated by the vibrating diaphragm. The plunger pad 410 may be further depressed so as to engage the diaphragm 404 so as to change the vibration states of the diaphragm 404, thereby changing the sound generated by the call 100. As the plunger 106 is depressed further, the plunger pad 410 further engages the diaphragm 404, further changing the sound generated. The diaphragm can be pressed into contact with the underside of the sound chamber dome 406, thereby limiting the amount of the diaphragm which is available for vibration the diaphragm can be further depressed so that the only area of the diaphragm which is not in contact with the sound chamber dome is the central area spanning the tone trough 408. At this point, the plunger 106 is fully depressed, the airflow passage is at a minimum size, resulting in maximum airflow velocity (assuming constant air being blown into the inlet port) and the amount of the diaphragm available for vibration is at a minimum. When the plunger 106 is released, the resilient pliable segment returns to its original position, the airflow passage returns to its original size, and the sound generated by the call returns to the sound generated earlier. The manipulations of the plunger while the call is being blown permits for a widely variable range of sound output from the call so as to better emulate the sound of a wild animal.

These well-known sounds made by a cow elk and elk fawns are referred to herein as natural elk calls. While elk may each have a unique call, they have common characteristics which are well known to hunters and designers of elk calls. The tuning of the present invention and the optimization of the parameters of this call during design and manufacture are often done by careful listening to the sound produced by an individual familiar with these natural elk calls. While it is possible to use sophisticated electronic sound-measuring equipment, it is believed that the present invention may be readily manufactured without such equipment, if an individual who is familiar with such natural elk calls assists in the process. It is also believed that the present invention is readily adaptable for use in calling many other types of game animals. The diaphragm may be changed, or multiple diaphragms may be used, the size and shape of the call 100 may be changed as well to address peculiar sound requirements for different types of animals.

The term "sound chamber" is used throughout to suggest that sound may be reflected off walls and thereby affect the nature or direction of the sound. "Sound chamber" as used herein does not necessarily require that a resonant frequency exist within the sound chamber.

The term "diaphragm" is used herein to refer to any sound-producing material such as latex, which is capable of generating sound when air passes over the diaphragm. Multiple layers of latex are also contemplated as well. "Diaphragm" shall not be read to include a longitudinal reed which is held only at one end and has an elongated curved free surface which extends substantially beyond the structure which grasps the end of the reed.

It is thought that the method and apparatus of the present invention will be understood from the foregoing description and that it will be apparent that various changes may be made in the form, construct steps and arrangement of the parts and steps thereof, without departing from the spirit and scope of the invention, or sacrificing all of their material advantages. The form herein described is merely a preferred exemplary embodiment thereof.

What is claimed is:

1. A game call comprising:
    a mouthpiece body having an air inlet end and an air outlet end and an air flow axis along the mouthpiece body between the air inlet end and the air outlet end;
    a diaphragm disposed within the mouthpiece body between the air inlet end and the air outlet end and adapted to vibrate and generate sound when air is blown into the inlet end;
    a pliable segment extending parallel with the air flow axis and spaced from and opposing the diaphragm so that manipulation of the pliable segment causes the pliable segment to contact the diaphragm to change the sound; and
    an opening in a central portion of the mouthpiece body, the opening exposing a portion of the pliable segment to provide access to the pliable segment for manipulation of the pliable segment.

2. The game call of claim 1 wherein the mouthpiece body is a tube.

3. The game call of claim 1 wherein the diaphragm is disposed along the airflow axis.

4. The game call of claim 3 wherein the diaphragm is detachable from the mouthpiece body.

5. The game call of claim 1 further comprising a sound chamber structure disposed on a side of the diaphragm opposite the pliable segment.

6. The game call of claim 5 wherein the sound chamber structure is integral with the mouthpiece body.

7. The game call of claim 5 wherein the diaphragm and the sound chamber structure are operatively coupled together.

8. The game call of claim 7 wherein the diaphragm and the sound chamber structure are detachable from the mouthpiece body.

9. The game call of claim 5 wherein the sound chamber structure is generally dome-shaped.

10. The game call of claim 9 wherein the sound chamber structure having a trough configured to allow portions of the diaphragm to vibrate despite contact between portions of the diaphragm and the sound chamber structure.

11. The game call of claim 1 further comprising a plunger adapted to depress the pliable segment when the plunger is manipulated by a human digit.

12. The game call of claim 11 wherein the plunger is detachably coupled to the mouthpiece body.

13. The game call of claim 11 wherein the plunger pivots about a plunger axis which is generally perpendicular to the airflow axis.

14. The game call of claim 1 wherein the diaphragm spans across a U-shaped frame.

15. The game call of claim 14 wherein the diaphragm and U-shaped frame are coupled together as a single unit detachable from the mouthpiece body.

16. The game call of claim 14 wherein the diaphragm, U-shaped frame and sound chamber structure are operatively connected as a single unit detachable from the mouthpiece body.

17. A game call comprising:
   a tube having a mouthpiece end and an air outlet end and an air flow axis along the tube between the mouthpiece end and the air outlet end;
   a diaphragm unit comprising a U-shaped frame and a diaphragm spanning across the frame, the diaphragm unit being detachably mounted within the tube between the mouthpiece end and the air outlet end and adapted to vibrate and generate sound when air is blown into the mouthpiece end;
   a pliable segment extending parallel with the air flow axis and spaced from and opposing the diaphragm so that manipulation of the pliable segment causes the pliable segment to contact the diaphragm;
   an opening in a central portion of the tube, the pliable segment disposed within the opening thereby providing access to the pliable segment to allow for manipulation of the pliable segment; and
   a sound chamber structure disposed on a side of the diaphragm opposite the pliable segment.

18. The game call of claim 17 wherein the diaphragm unit is disposed along the airflow axis.

19. The game call of claim 17 wherein the sound chamber structure is integral with the tube.

20. The game call of claim 17 wherein the diaphragm unit is coupled to the sound chamber structure.

21. The game call of claim 20 wherein the diaphragm unit and the sound chamber structure are detachable from the tube.

22. The game call of claim 17 wherein the sound chamber structure is generally dome-shaped.

23. The game call of claim 17 wherein the sound chamber structure having a trough configured to allow portions of the diaphragm to vibrate despite contact between portions of the diaphragm and the sound chamber structure.

24. The game call of claim 17 further comprising a plunger adapted to depress the pliable segment when the plunger is manipulated by a human digit.

25. The game call of claim 24 wherein the plunger is detachably coupled to a mouthpiece body.

26. The game call of claim 25 wherein the plunger pivots about a plunger axis which is generally perpendicular to the airflow axis.

27. A game call comprising:
   a tube having a mouthpiece end and an air outlet end and an air flow axis along a length of the tube;
   a diaphragm unit comprising a U-shaped frame and a diaphragm spanning across the frame, the diaphragm unit being detachably mounted within the tube between the mouthpiece end and the air outlet end and adapted to vibrate and generate sound when air is blown into the mouthpiece end;
   a pliable segment extending parallel with the air flow axis and spaced from and opposing the diaphragm so that manipulation of the pliable segment causes the pliable segment to contact the diaphragm;
   an opening in a central portion of the tube, the opening exposing a portion of the pliable segment;
   a sound chamber structure disposed on a side of the diaphragm opposite the pliable segment; and
   a plunger adapted to depress the portion of the pliable segment into the opening when the plunger is manipulated by a human digit.

* * * * *